United States Patent
Hsu et al.

(10) Patent No.: US 8,045,424 B2
(45) Date of Patent: Oct. 25, 2011

(54) READING METHOD AND DEVICE FOR OPTICAL DISK DRIVES

(75) Inventors: Chin-Fa Hsu, Taoyuan County (TW); Shih-Kuo Chen, Taoyuan County (TW); Shiu-Ming Chu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 245 days.

(21) Appl. No.: 12/467,241

(22) Filed: May 15, 2009

(65) Prior Publication Data
US 2010/0008194 A1  Jan. 14, 2010

(30) Foreign Application Priority Data
Jul. 14, 2008 (TW) ............................... 97126720 A

(51) Int. Cl.
*G11B 21/08* (2006.01)
(52) U.S. Cl. .................. 369/30.15; 369/44.28
(58) Field of Classification Search .............. 369/30.1, 369/30.12, 30.13, 30.15, 44.11, 44.28
See application file for complete search history.

(56) References Cited

U.S. PATENT DOCUMENTS

| | | | | |
|---|---|---|---|---|
| 4,866,687 A * | 9/1989 | Kasai et al. | ........... | 369/30.15 |
| 4,926,405 A * | 5/1990 | Hangai et al. | ........... | 369/30.16 |
| 5,309,417 A * | 5/1994 | Onodera et al. | ........... | 369/30.15 |
| 6,011,760 A * | 1/2000 | Fleming, III | ........... | 369/30.28 |
| 6,055,218 A * | 4/2000 | Takeda et al. | ........... | 369/44.28 |
| 6,157,597 A * | 12/2000 | Fleming, III | ........... | 369/30.3 |
| 6,175,537 B1 * | 1/2001 | Fleming, III | ........... | 369/30.06 |
| 6,347,065 B1 * | 2/2002 | Fleming, III | ........... | 369/30.2 |
| 6,349,078 B1 * | 2/2002 | Hsu et al. | ........... | 369/30.16 |
| 6,721,239 B2 * | 4/2004 | Kishimoto et al. | ........... | 369/30.17 |
| 7,057,983 B2 * | 6/2006 | Turner et al. | ........... | 369/44.41 |
| 7,593,293 B2 * | 9/2009 | Kameda | ........... | 369/30.15 |
| 7,885,150 B2 * | 2/2011 | Yamada et al. | ........... | 369/44.28 |
| 2001/0046190 A1 * | 11/2001 | Miyazaki | ........... | 369/30.15 |
| 2002/0057630 A1 * | 5/2002 | Kishimoto et al. | ........... | 369/30.17 |
| 2005/0099900 A1 * | 5/2005 | Buchler | ........... | 369/44.28 |
| 2006/0146664 A1 * | 7/2006 | Van Brocklin et al. | ........... | 369/44.27 |
| 2007/0115768 A1 * | 5/2007 | Yamada et al. | ........... | 369/44.28 |

FOREIGN PATENT DOCUMENTS

TW    I238386    8/2005

\* cited by examiner

*Primary Examiner* — Daniell L Negron
*Assistant Examiner* — Brenda Bernardi
(74) *Attorney, Agent, or Firm* — Rabin & Berdo, P.C.

(57) ABSTRACT

A reading method and a reading device for an optical disk drive, which reads data on a track of an optical disk, receives a host command to read required data, checks cache data, reads cache required data to respond to the command, sets the required data to a target track of the optical disk if no required data exists, calculates moving time for which an optical head is moved from a current position to the target track by way of track jumping and track skipping, respectively, compares the moving time for the track skipping and the track jumping with each other, selects one of the track jumping and the track skipping corresponding to the shorter one of the moving time, moves the optical head to the target track to read the required data and responds to the host command to enhance the reading efficiency.

5 Claims, 4 Drawing Sheets

READING METHOD AND DEVICE FOR OPTICAL DISK DRIVES

This application claims the benefit of Taiwan application Serial No. 97126720, filed Jul. 14, 2008, the subject matter of which is incorporated herein by reference.

BACKGROUND OF THE INVENTION

1. Field of the Invention

The invention relates in general to an optical disk drive, and more particularly to a method and a device for quickly reading data by controlling an optical head to move in different ways when the optical disk drive is reading data on an optical disk.

2. Description of the Related Art

The conventional optical disk has concentric circles or a spiral track. The track is divided into several data blocks each having an address and for recording data. When the data on the optical disk is being read, the track has to be locked and sought. The required data cannot be correctly read until the address of the data block is reached.

FIG. 1 (Prior Art) is a flow chart showing a reading method for a conventional optical disk drive in Taiwan Patent No. 1238386. In step P1, the conventional optical disk receives a command of an external host for reading data on the optical disk, and the operation of reading the data is started. Next, in step P2, it is checked whether cache data in a memory contains the required data to be read according to the command. If the cache data contains the required data, the procedure enters step P3, and the required data is directly read from the memory and replied to the host in step P8. If the cache data does not contain the required data, the procedure enters step P4, in which the block address of the required data is obtained according to the catalogue information of the optical disk, and the position of the optical disk where the required data may be read is set.

Next, in step P5, the optical head is moved across the track from the current position to the set position. Then, the procedure enters step P6 to lock the track and seek the track and read the data to the memory. In step P7, the read data in the memory is processed and interpreted into the required data stored in the memory to serve as the cache data. Then, in step P8, the interpreted required data is replied to the host. At last, the command of the host of reading the data ends in step P9. Therefore, the optical disk drive may utilize the data pre-stored in the memory as the cache data to increase the speed of the optical disk drive for reading the data.

However, when the memory of the conventional optical disk drive does not contain the cache data to be read by the host, the optical head has to jump to the block address of the required data of the optical disk to read the data. The track jumping servo has to calculate the number of tracks and the distance of track jumping, to ensure that the objective lens is within the range where the optical head can maintain the signal, to unlock the track to form the servo open-loop, and then to apply a suitable driving force to the optical head so that the optical head can jump to the target track, and then form the servo closed-loop, lock the read track and determine whether the optical head reaches the target track or not. If not, the track jumping operation is performed again until the optical head reaches the target track so that the required data can be correctly read.

The optical disk is rotated at a very high speed relative to the optical head, and the tracks are very dense or even the track may have the eccentric deformation. So, the typical track jumping needs to be performed many times so that the optical head can reach the target track. Thus, it is very time-consuming. More particularly, in order to finish the reading command, many times of track jumping have to be continuously performed in the optical disk drive to read the discontinuous required data from many positions and the operations become more time-consuming. In addition, the capacity of the memory of the optical disk drive is limited, and the memory mainly serves as the buffer memory for processing the data and cannot save a lot of cache data. The optical disk drive mainly reads the required data from the optical disk, so the reading efficiency of the optical disk drive cannot be effectively enhanced when the data is read by way of track jumping in the optical disk drive. Therefore, the conventional method for the optical disk drive for reading the data on the optical disk still has problems to be solved.

SUMMARY OF THE INVENTION

The present invention is directed to a reading method and a reading device for an optical disk drive, wherein estimated time for movements of track jumping and track skipping to reach the target track are compared with each other, and one of the movements corresponding to the shorter time is selected so that the reading efficiency is enhanced.

The present invention is also directed to a reading method and a reading device for an optical disk drive, wherein the track jumping servo or the track skipping servo to the target track is selected according to the distance from the block of the required data to the target track so that the time of reading data is saved.

According to a first aspect of the present invention, a reading device for an optical disk drive connected to a host is provided. The device includes a microprocessor, a setting reading unit, a track seeking servo unit and a memory. The microprocessor receives and responds to a host command to read required data. The setting reading unit sets a target track of the required data, calculates moving time for movements of track jumping and track skipping to the target track, compares the moving time with each other, selects and returns one of the movements of the track jumping and the track skipping to the microprocessor. The track seeking servo unit, controlled by the microprocessor, controls a movement of an optical head to the target track to read the required data by way of the track jumping or the track skipping according to the selected movement. The memory stores the read required data, which is transmitted to the host under control of the microprocessor.

According to a second aspect of the present invention, a reading method for an optical disk drive, which reads data on a track of an optical disk, is provided. The method includes the steps of: (1) receiving a command to read required data; (2) checking whether cache data contains the required data, and reading the cache required data to respond to the command if the cache data contains the required data, or otherwise entering step (3); (3) setting the required data to a target track of the optical disk; (4) calculating moving time for movements from a current position to the target track by way of track jumping and track skipping; (5) comparing whether the moving time for the track jumping is longer than the moving time for the track skipping, and selecting the movement of the track skipping and then entering step (6), or otherwise selecting the movement of the track jumping and then entering the step (6); and (6) moving an optical head to the target track according to the selected movement to read the required data to respond to the command.

According to a third aspect of the present invention, a reading method for an optical disk drive, which reads data on a track of an optical disk, is provided. The method includes the steps of: (1) receiving a command to read required data; (2) setting the required data on a target track of the optical disk; (3) calculating a moving distance from a current position to the target track; (4) determining whether the moving distance is longer than a predetermined value, and selecting a movement of track jumping and then entering step (5) if the moving distance is longer than the predetermined value, or otherwise selecting a movement of track skipping and then entering the step (5); and (5) moving an optical head to the target track according to the selected movement to read the required data and to respond to the command.

The invention will become apparent from the following detailed description of the preferred but non-limiting embodiments. The following description is made with reference to the accompanying drawings.

DETAILED DESCRIPTION OF THE INVENTION

Figure 1:
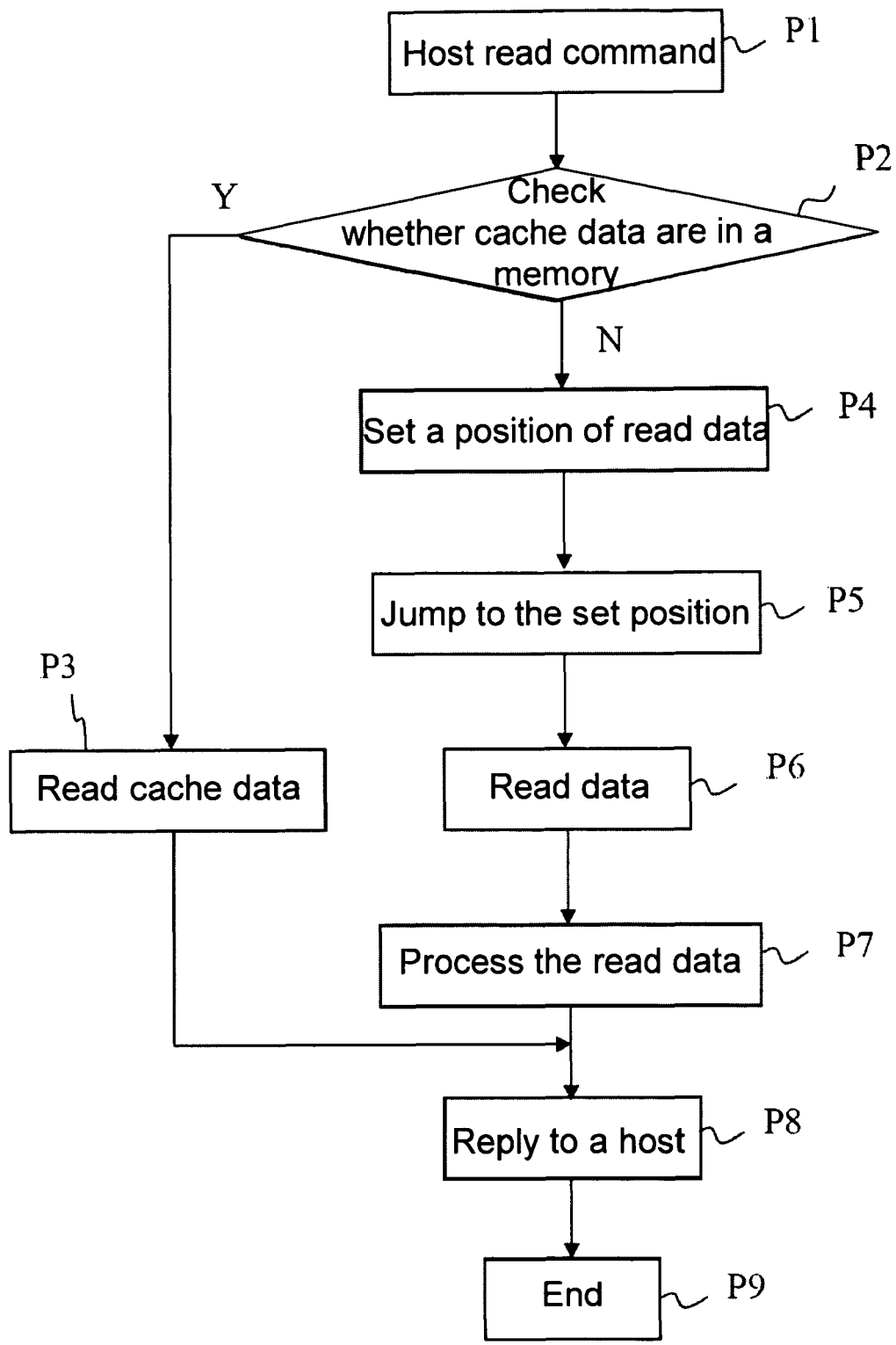
FIG. 1 (Prior Art) is a flow chart showing a reading method for a conventional optical disk drive.
Figure 2:
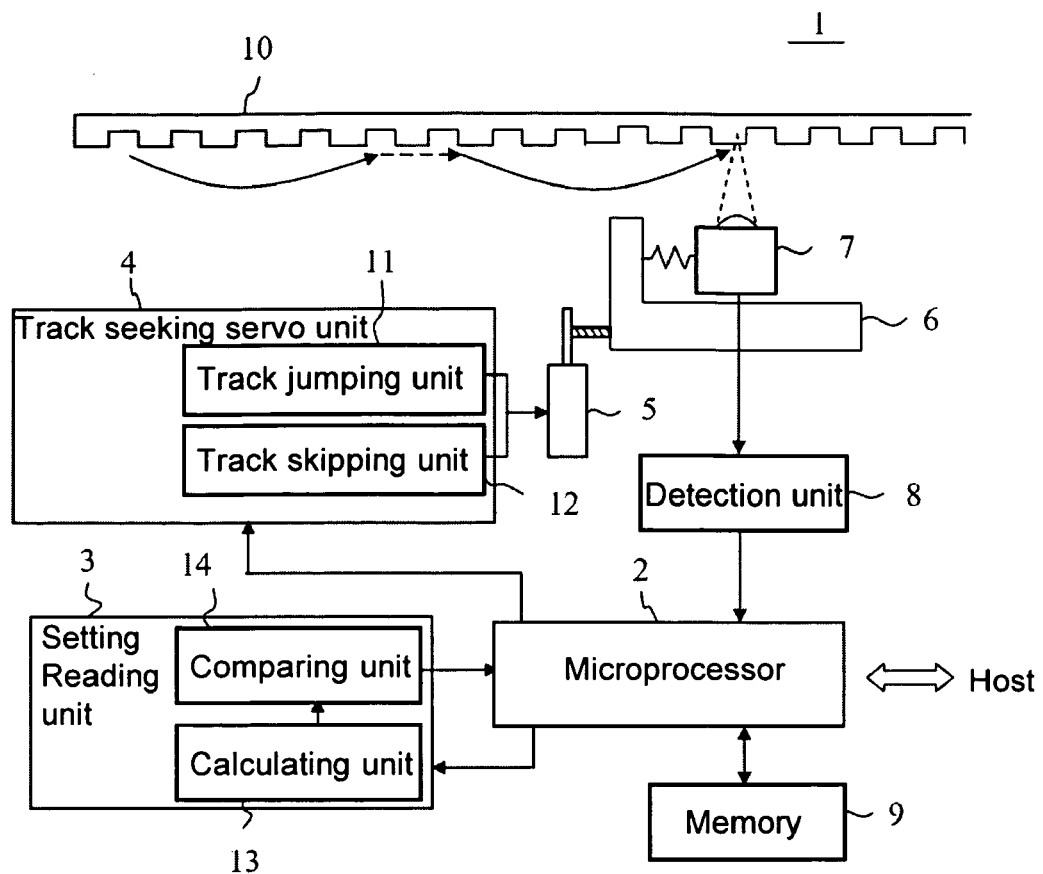
FIG. 2 is a system block diagram showing a reading device for an optical disk drive according to the invention.

FIG. 2 is a system block diagram showing a reading device 1 for an optical disk drive according to the invention. Referring to FIG. 2, the reading device 1 includes a microprocessor 2, a setting reading unit 3, a track seeking servo unit 4, a driving motor 5, an optical head 6, an objective lens 7, a detection unit 8 and a memory 9. The microprocessor 2 of the reading device 1 receives a command of an external host for reading required data of an optical disk 10. The setting reading unit 3 sets a position and a target track of the required data according to an address of the required data. The track seeking servo unit 4 is controlled, and the driving motor 5 drives the optical head 6 to move to the target track of the optical disk 10, to lock and move along the target track. A light beam is projected onto the optical disk 10 through the objective lens 7 thereon, and the required data is read from the target track. The detection unit 8 receives the reflected light from the optical disk 10 to generate electric signals corresponding to the intensity of the reflected light. The microprocessor 2 interprets the electric signals into data signals and control signals. The data signals are stored in the memory 9 and transmitted back to the host, and the operation of the reading system is controlled according to the control signals.

The track seeking servo unit 4 can lock and can move along the track, and is also controlled by the microprocessor 2 to provide two movement servo methods for a track jumping unit 11 and a track skipping unit 12. The track jumping unit 11 calculates the number of tracks and the distance for track jumping from the current position to the target track according to the set target track, and then identifies that the objective lens 7 is in the range wherein the optical head 6 can relatively maintain the signal. The track jumping operation state of the track seeking servo unit 4 is eliminated to form the servo open-loop, and the suitable driving voltage is applied to the driving motor 5 so that the optical head 6 is radially moved across the tracks and jumps to the target track, as indicated by the solid line movement path in the drawing. Then, the servo closed-loop is recovered, and the data on the track is read by the track jumping operation. The arrival at the target track is verified and the required data is read.

The track skipping unit 12 calculates the number of tracks and the distance for track seeking from the current position to the target track according to the set target track. The optical head 6 slides to the target track along the track path without changing the close loop of the track seeking servo unit 4, as indicated by the dashed line movement path in the drawing. The sliding optical head 6 does not read data, and only reads the address information of the passed data blocks. The optical head 6 is precisely controlled to the target track to read the required data.

Figure 3:
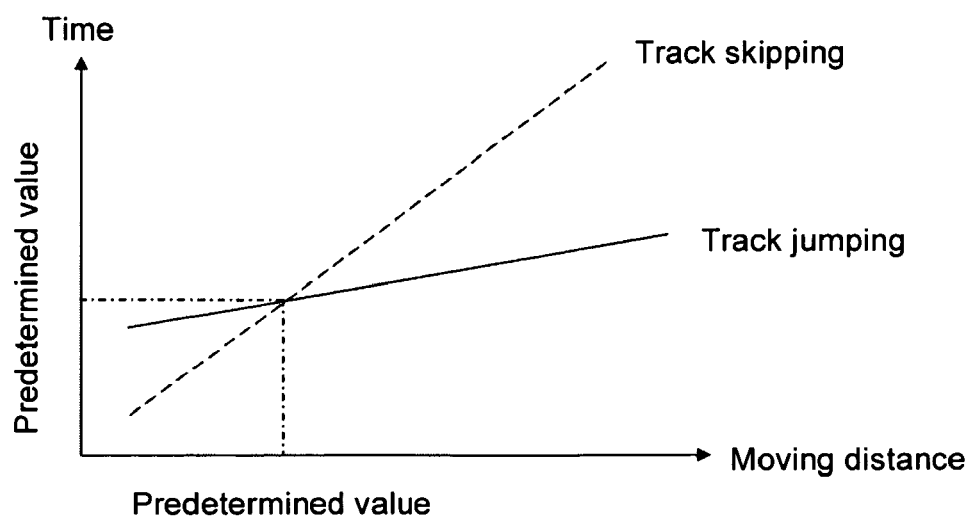
FIG. 3 is a graph showing the relationship between the time and moving distances for movements of track jumping and track skipping of the invention.

FIG. 3 is a graph showing the relationship between the time and moving distances for movements of the track jumping and the track skipping of the invention. As shown in FIG. 3, the track jumping movement needs the essential procedures, such as the position verification operation, the track unlocking operation, the open loop switching operation, the track jumping operation, the closed-loop switching operation, the track locking operation, and the target track arrival verifying operation. So, the time for reading the data is longer, and the track jumping movement is suitable for the long distance movement. The track skipping movement does not need the procedures, such as the open and closed loop switching operations and the track jumping operation, but the wrapping distance of the track of the optical disk is long. It is time-consuming to perform the track seeking movement. The track skipping movement is only suitable for the shorter distance movement. Compared the track jumping movement with the track skipping movement, it is found that a predetermined value may be set as a boundary. When the time or distance is smaller than the predetermined value, the track skipping movement saves the longer time than the track jumping movement. However, when the time or distance is greater than the predetermined value, the track jumping movement saves the longer time than the track skipping movement.

Referring again to FIG. 2, the setting reading unit 3 of the reading device 1 of the optical disk drive additionally includes a calculating unit 13 and a comparing unit 14. The calculating unit 13 estimates the time spent for the track jumping or track skipping movement from the current position to the target track according to the target track set by the setting reading unit 3. The track jumping movement encounters the position verification operation, the track unlocking operation, the open loop switching operation, the track jumping operation, the closed-loop switching operation, the track locking operation and the target track arrival verifying operation. The track jumping operation changes with the number of tracks of track jumping, and the other operation procedures are fixed. So, the spent time may be estimated. In addition, the straight line moving distance of the optical head may be calculated according to the track pitch and the number of tracks of track jumping. Also, the spent time for movement may be estimated according to the speed of the optical head driven by the voltage. So, the spent time for the track jumping movement may be estimated. The track skipping movement is only the movement along the track, so the time for the movement may be estimated according to the number of tracks of the movement to the target track, the radius and the rotating speed of the optical disk. The comparing unit 14 performs the comparison and the selection according to the moving time for the track jumping or the track skipping, which is calculated by the calculating unit 13, and the moving method for the optical head is determined according to the shorter spent time, and the information is returned to the microprocessor 2 to control the track seeking servo unit 4.

Figure 4:
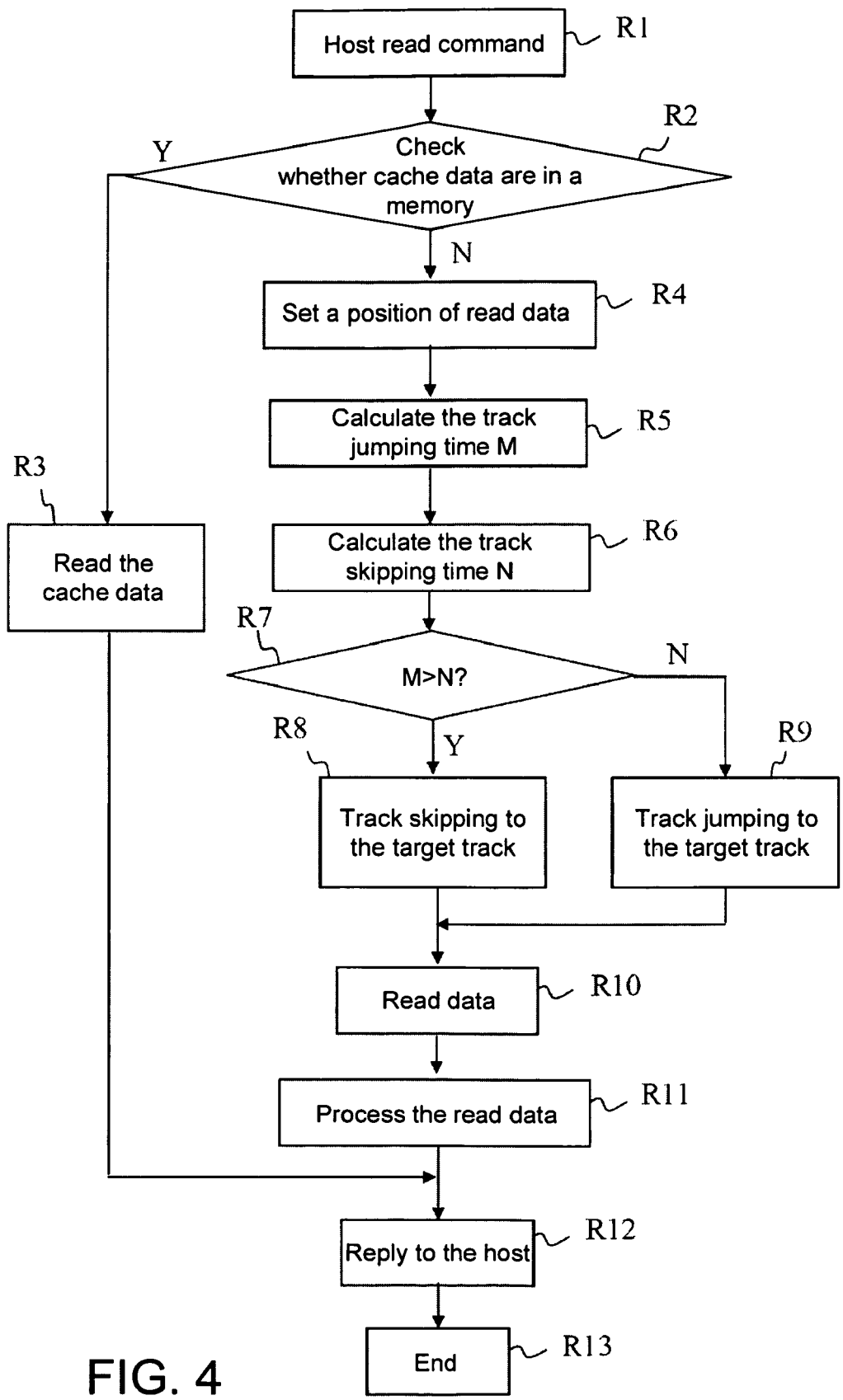
FIG. 4 is a flow chart showing a reading method for an optical disk drive according to a first embodiment of the invention.

FIG. 4 is a flow chart showing a reading method for an optical disk drive according to a first embodiment of the invention. As shown in FIG. 4, the reading method for the optical disk drive in this embodiment is to compare the estimated spent time for different methods of moving the optical head to the target track, and to determine the method of moving the optical head according to the shorter spent time so that the time of reading the data can be saved.

The detailed steps will be described with reference to FIGS. 2 and 4. In step R1, a command of an external host for reading data on the optical disk 10 is received, and the operation of reading the data is started. In step R2, it is checked whether the cache data of the memory 9 contains the required data to be read according to the host command. If the cache data contains the required data, the procedure enters step R3, and the cache required data is directly read from the memory 9. In step R12, the information is replied to the host. If the cache data does not contain the required data, the procedure enters step R4, in which the block address of the required data is obtained according to the catalogue information of the optical disk 10, and the setting reading unit 3 sets the position and the target track on the optical disk 10 where the required data may be read.

Next, in step R5, the calculating unit 13 estimates the spent time M for the track jumping movement from the current position to the target track according to the target track set by the setting reading unit 3. In step R6, the spent time N for the track skipping movement from the current position to the target track is estimated. Next, in step R7, the comparing unit 14 performs the comparison according to the moving times for track jumping and track skipping calculated by the calculating unit 13 to determine whether the track jumping moving time M is longer than the track skipping moving time N. If the time M is longer than the time N, the procedure enters step R8. In the step R8, the microprocessor 2 selects the track skipping movement, controls the track skipping unit 12 of the track seeking servo unit 4, and controls the driving motor 5 to move the optical head 6 to the target track along the track. Then, the procedure enters step R10 to read the required data to the memory 9. If the track jumping moving time M is not longer than the track skipping moving time N, the procedure enters step R9. In the step R9, the microprocessor 2 selects the track jumping movement, controls the track jumping unit 11 of the track seeking servo unit 4, and controls the driving motor 5 to move the optical head 6 across the tracks and to the target track. Then, the procedure enters the step R10 to read the required data to the memory 9. In step R11, the read data in the memory is processed and interpreted into the required data, which is stored in the memory to serve as the cache data. In the step R12, the interpreted required data is replied to the host. At last, in step R13, the command of the host for reading the data ends.

Therefore, in the reading method for the optical disk drive according to the first embodiment of the invention, the estimated time for the track jumping movement and the track skipping movement of the optical head from the current position to the target track wherein the required data exists may be compared with each other, and the movement corresponding to the shorter time is selected to move the optical head to the target track. Thus, the time of reading the data may be shortened, and the read efficiency may be enhanced.

Figure 5:
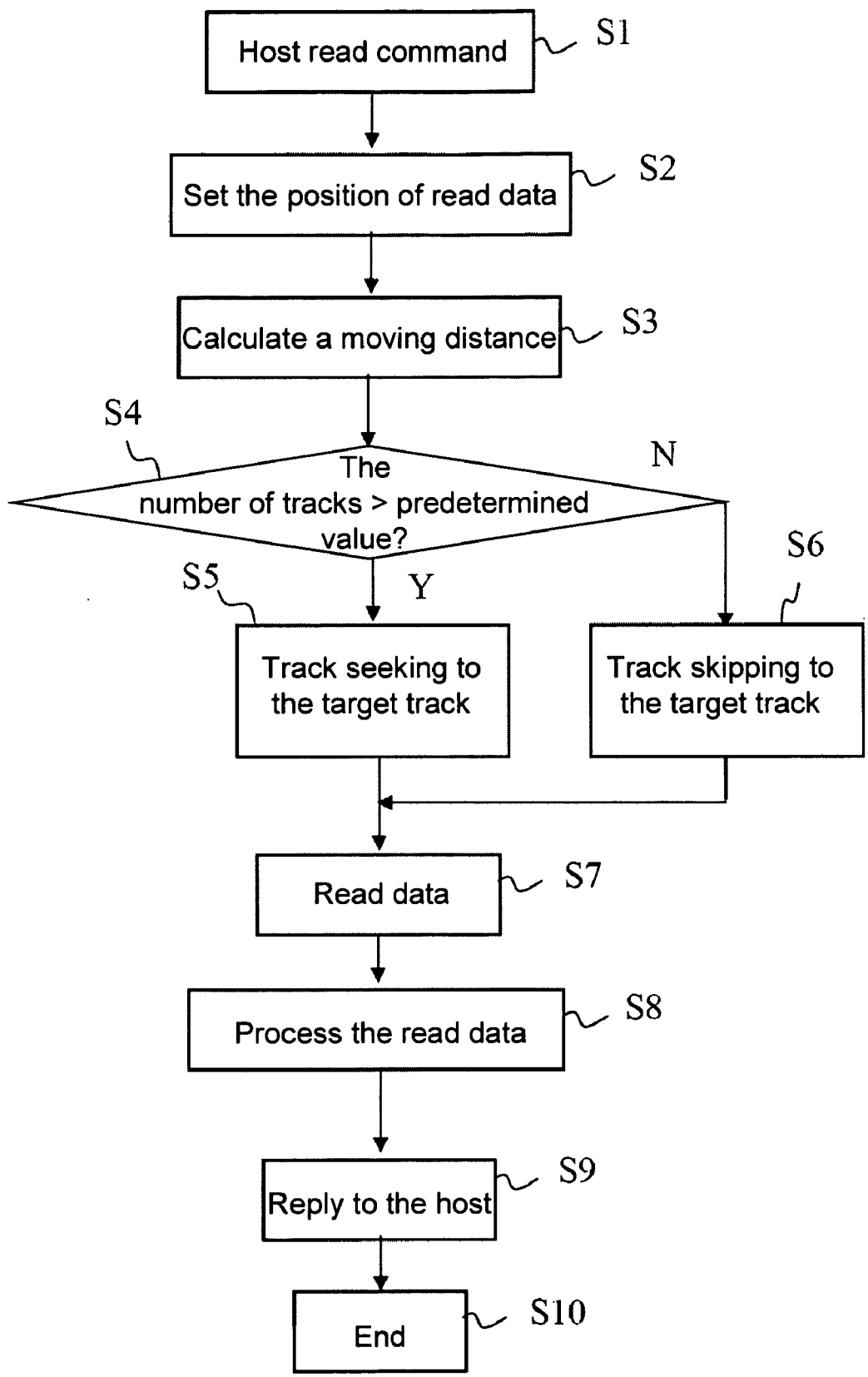
FIG. 5 is a flow chart showing a reading method for an optical disk drive according to a second embodiment of the invention.

FIG. 5 is a flow chart showing a reading method for an optical disk drive according to a second embodiment of the invention. As shown in FIG. 5, the basic system and the method of this embodiment are substantially the same as those of the first embodiment except that the second embodiment determines the method of moving the optical head to save the data reading time by comparing the moving distance of the optical head to the target track with a predetermined value. The spent time is estimated according to the track jumping movement encountered by the position verification operation, the track unlocking operation, the open loop switching operation, the track jumping operation, the closed-loop switching operation, the track locking operation and the target track arrival verifying operation. Then, the number of tracks that may be passed by the track skipping movement is estimated according to the spent time and the known rotating speed of the optical disk. Next, the radial distance is calculated according to the track pitch and the number of tracks. Finally, the calculating unit estimates the predetermined value. The predetermined value may also be determined according to the actually measured result. Therefore, as long as the current address and the address of the target track are known, the calculating unit may also multiply the number of tracks of the movement by the track pitch to obtain the moving distance. Then, the comparing unit compares the moving distance with the predetermined value to determine the method of moving the optical head.

The detailed steps of the reading method for the optical disk drive according to the second embodiment of the invention will be described with reference to FIGS. 5 and 2. In step S1, a command of an external host for reading data on the optical disk 10 is received, and the operation of reading the data is started. In step S2, the block address of the required data is obtained according to the catalogue information of the optical disk 10, and the setting reading unit 3 sets the position and the target track wherein the required data may be read. Then, in step S3, the calculating unit 13 estimates the moving distance from the current position to the target track according to the target track set by the setting reading unit 3. Next, in step S4, the comparing unit 14 compares the moving distance with a predetermined value according to the moving distance calculated by the calculating unit 13. If the moving distance is greater than the predetermined value, the procedure enters step S5, and the microprocessor 2 selects the track jumping movement, controls the track jumping unit 11 of the track seeking servo unit 4, and controls the driving motor 5 to move the optical head 6 across the tracks to the target track. Then, the procedure enters step S7 to read the required data to the memory 9. If the moving distance is not greater than the predetermined value, the procedure enters step S6. In the step S6, the microprocessor 2 selects the track skipping movement, controls the track skipping unit 12 of the track seeking servo unit 4, and controls the driving motor 5 to move the optical head 6 along the track to the target track. Then, the procedure enters the step S7 to read the required data to the memory 9. In step S8, the read data in the memory is processed and interpreted into the required data, which is stored in the memory to serve as the cache data. In step S9, the interpreted required data is replied to the host. At last, in step S10, the command of the host for reading the data ends.

Therefore, the reading method for the optical disk drive according to the second embodiment of the invention may also compare the predetermined value with the moving distance of the optical head from the current position to the target track where the required data locates without the essential step of checking the cache data. When the moving distance is not greater than the predetermined value, it means that the moving distance corresponding to the track skipping saves more spent time. When the moving distance is greater than the predetermined value, the long distance movement corresponding to the track jumping saves more time. So, the overall time of reading the data can be shortened, and the reading efficiency may be enhanced. In addition, the calculation of the moving distance in this embodiment is simpler than the complicated calculation of the track jumping of the first embodiment. According to the calculation of the moving distance, it is obtained that the moving distance is directly proportional to the number of tracks, and the moving distance may also be replaced with the number of tracks.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A reading method for an optical disk drive, which reads data on a track of an optical disk, the method comprising the steps of:
    (1) receiving a command to read required data;
    (2) setting the required data on a target track of the optical disk;
    (3) calculating a moving distance from a current position to the target track;
    (4) determining whether the moving distance is longer than a predetermined value, and selecting a movement of track jumping and then entering step (5) if the moving distance is longer than the predetermined value, or otherwise selecting a movement of track skipping and then entering the step (5); and
    (5) moving an optical head to the target track according to the selected movement to read the required data and to respond to the command, wherein the predetermined value in step (4) is estimated by
        estimating a time for the movement of the track jumping based on a position verifying operation, a track unlocking operation, an open loop switching operation, a track jumping operation, a closed-loop switching operation, a track locking operation and a target track arrival verifying operation,
        estimating the number of tracks that may be passed by the movement of track skipping in the estimated time under a known rotating speed of the optical disk, and
        converting the number of tracks into a radial distance according to a track pitch so as to estimate the predetermined value.

2. The method according to claim 1, wherein a position and the target track of the required data are set and a block address of the required data is obtained according to catalogue information of the optical disk.

3. The method according to claim 1, wherein the received command comes from an external host.

4. The method according to claim 1, wherein the data read in the step (5) is saved to a memory and then interpreted into the required data.

5. The method according to claim 1, wherein the moving distance corresponds to the number of tracks.

* * * * *